(12) United States Patent
Morton et al.

(10) Patent No.: US 8,240,718 B2
(45) Date of Patent: Aug. 14, 2012

(54) SANITARY QUICK CONNECTOR

(75) Inventors: John E. Morton, Peterborough, NH (US); George Carmichael, Rindge, NH (US)

(73) Assignee: HITCO, Inc., Oyster Bay, NY (US)

( * ) Notice: Subject to any disclaimer, the term of this patent is extended or adjusted under 35 U.S.C. 154(b) by 39 days.

(21) Appl. No.: 12/785,432

(22) Filed: May 22, 2010

(65) Prior Publication Data

US 2010/0289260 A1 Nov. 18, 2010

Related U.S. Application Data

(63) Continuation-in-part of application No. 11/828,407, filed on Jul. 26, 2007, now abandoned.

(60) Provisional application No. 60/820,650, filed on Jul. 28, 2006.

(51) Int. Cl.
*F16L 37/00* (2006.01)

(52) U.S. Cl. .......................... 285/312; 285/84; 285/320

(58) Field of Classification Search ................. 285/81, 285/84–88, 312, 320, 311
See application file for complete search history.

(56) References Cited

U.S. PATENT DOCUMENTS

| | | |
|---|---|---|
| 3,124,374 A | 3/1964 | Krapp |
| 3,276,620 A | 10/1966 | Dorfman |
| 3,877,732 A | 4/1975 | Mohaupt |
| 4,618,171 A | 10/1986 | Fahl |
| 4,647,075 A | 3/1987 | Vargo |
| 4,765,145 A | 8/1988 | Hines |
| 5,042,849 A | 8/1991 | Kersting |
| 5,295,717 A * | 3/1994 | Chen ............................... 285/84 |
| 5,722,697 A | 3/1998 | Chen |
| 5,863,079 A * | 1/1999 | Donais et al. ................... 285/45 |
| 6,047,995 A * | 4/2000 | Kotake ............................ 285/85 |
| 6,073,969 A * | 6/2000 | Zimmerly ....................... 285/12 |
| 6,079,752 A | 6/2000 | Meisinger |
| 6,364,369 B2 * | 4/2002 | Bailey ............................ 285/312 |
| 6,447,016 B2 * | 9/2002 | Collier ............................ 285/81 |
| 6,863,086 B2 | 3/2005 | Heiberger |

\* cited by examiner

*Primary Examiner* — James Hewitt
*Assistant Examiner* — Jay R Ripley
(74) *Attorney, Agent, or Firm* — Maine Cernota & Rardin

(57) ABSTRACT

A quick-connect sanitary fluid connector system provides for connection of a sanitary fluid system to an industry standard, flanged sanitary fitting. The standard fitting is placed in abutting relation to a sanitary gasket and to a first fitting of the quick connector, and at least two eccentric cams operated by cam levers press against the back surface of the standard connector flange, thereby applying pressure to the juncture and forming an abutted sanitary seal which avoids fluid entrapment within the connector. The joining pressure can be adjustable by threaded rotation of the first fitting within a connector body. The cam levers can include locking holes and pins for locking the levers in their locking positions. Insertion of the standard fitting can automatically open the cams, and springs can automatically return the cam levers to their locking positions. Spring retracted telescoping cam levers can be automatically latched in their locking positions.

16 Claims, 12 Drawing Sheets

SANITARY QUICK CONNECTOR

RELATED APPLICATIONS

This application is a continuation in part of co-pending U.S. application Ser. No. 11/828,407, filed Jul. 27, 2007, which claims the benefit of U.S. Provisional Application 60/820,650, filed Jul. 28, 2006. Each of these applications is herein incorporated by reference in their entirety for all purposes.

FIELD OF THE INVENTION

The invention relates to quick connectors for connecting sanitary fluid systems to sanitary fittings, and, more particularly, to ISO 2852, ASME BPE, and 3-A sanitary hygienic fittings.

BACKGROUND OF THE INVENTION

Sanitary couplings are used in food processing, dairy, beverage, pharmaceutical, and biotechnology industries, where fluid lines are required to be joined by abutting unions of sanitary fittings so that fluid entrapment within parts of the connector body does not occur. Common sanitary fluid couplers rely on manual clamps to apply pressure to abutting components and secure them together, as is illustrated in prior art FIG. 6. These can be complicated assemblies which are often difficult to assemble by one person and can cause or contribute to repetitive motion injuries. These prior art fittings are also prone to being applied with only partial engagement, resulting in insufficient coupling pressure and consequent joint leakage or even separation. Various industry standards, including ISO 2852, ASME BPE, and 3-A, define the geometry and properties of "sanitary" fittings. Included are requirements that a sanitary fitting be suitable for operation at 150 psi fluid pressure, and be tested at up to 450 psi.

So-called "quick-connect" fittings are sometimes used in non-sanitary plumbing applications, such as hoses for emptying septic systems and pumping water from construction sites, but these fittings are not applicable to sanitary fitting applications, since they cannot meet the standards required for a sanitary fitting. In particular, while the quick-connect mechanisms of these prior art fittings serve to prevent the fittings from separating, they do not apply pressure to abutting components so as to form a gasket seal. In fact, these prior art quick connect fittings generally rely on threaded connections to form a fluid seal. This approach is not adaptable to sanitary fittings, because such threaded connections tend to provide opportunities for fluid entrapment, and cannot provide the pressure resistance required for a sanitary fitting. Also, such quick-connect fittings of the prior art require that both halves of the fitting be specially adapted for quick connection, and are therefore not suitable for quick connection to standard, pre-existing fittings.

SUMMARY OF THE INVENTION

The invention, simply stated, is a sanitary connector or coupling which can be quickly and easily attached to a standard, flanged sanitary fitting of a sanitary fluid system, such as one that terminates a fluid port or manifold or another fluid line, so as to provide a pressed, abutting seal which does not allow fluids flowing through the sanitary system to make contact with the coupling mechanism or structure. Specifications for fluid handling systems in sanitary processing usually require stainless steel tubing connected by a series of sanitary fittings. These fittings, referring again to prior art FIG. 6, require awkward posture and manipulation to assemble and disassemble, which increases the risk of improper coupling and of repetitive motion injuries.

The present invention provides a single-side coupling connector which is able to make a sanitary coupling to an existing, standard ISO, ASME BPE, and/or 3-A flanged sanitary fitting. The connector of the present invention is quick and easy to connect and disconnect, and otherwise meets industry requirements for sanitary fittings. To that end, connectors of the present invention are easily disassembled for cleaning, and connect directly to all ASME BPE, ISO 2852, and 3-A flanged sanitary fittings. In preferred embodiments the connection can be made using only one hand.

One embodiment of the present invention includes a first hose or tube fitting which conforms to industry standards for sanitary fluid flow system fittings and has a mating surface suitable for mating with a standard sanitary fitting gasket and flanged sanitary fitting. This component is combined with a connector body and cam lock system, the purpose of which is to provide for quick coupling and uncoupling of the first fitting to an industry standard, flanged sanitary fluid fitting, referred to herein as the second fitting. The joint or union can be described as a sealed, first fitting face, to a conforming industry standard gasket, and hence to a second fitting face with an abutting orientation, so that the coupler body and its components are isolated from fluid contact, all according to the applicable industry standards.

The cam lock mechanism which secures the compressed connection between the two fluid conducting fittings includes two or more eccentric cams which apply pressure to the back side of the external flange on the industry standard fitting, and thereby compress the gasket and lock the standard fitting against the sanitary fitting of the present invention with the gasket compressed there between. The shape of the cam lock is constructed so as to apply compressive pressure against the gasket as it is engaged, even though the portion of the cam lock which makes contact with the flanged fitting moves away from the joint as it is engaged.

In some embodiments there is an axially adjustable connection between the connector body and the first fitting, external of the fluid path, which affects the degree of compression placed on the union of the two fittings by the coupler when locked. It can be described and used as an initial adjustment prior to coupling to obtain a satisfactory initial degree of compression between the fittings, and/or used to adjust the compression after the connector is coupled to the selected second fitting. In operation, a quick connector of the present invention which may be installed, for example, on an end of a flexible fluid line, is placed over an industry standard, flanged sanitary fluid fitting and compressively secured thereto by operation of its cam lock mechanism. The cam lock action that secures the coupling is accomplished by a simple, manual, lever-action motion which rotates two or more cams into pressing contact against the backside of the flange on the industry standard sanitary fitting.

In various embodiments, the cam levers can be secured in their "locked" position by respective pins or other means, so as to inhibit unintended release of the cam lock. In some embodiments, the securing pins are permanently attached to the cam levers and are rotatable so as to engage with securing holes. In other embodiments, each cam lever includes a latching mechanism which automatically latches the cam lever in its locked position whenever it is placed there, and holds the cam lever in the locked position until the latching mechanism is released. In some of these embodiments, each cam lever is formed by a pair of telescoping elements connected by a spring and configured so that the cam lever is automatically expanded and a catch mechanism is automatically engaged as the cam lever is moved to its locked position, after which the cam lever must be pulled and extended so as to release it from its "locked" position.

The sanitary connector of the present invention can be disconnected from the standard sanitary fitting simply be reversing the actions described above, releasing the cam lever lock if applicable, executing an opening lever action to unlock and retract the cams, and then pulling the connector body and fluid line away from the second fitting.

One general aspect of the present invention is a quick-connect sanitary fluid connector for coupling a sanitary fluid system to a flanged standard sanitary fluid fitting. The quick connect sanitary fluid connector includes a first sanitary fluid fitting having a mating end and a fluid system end, the fluid system end being adapted for attachment to the sanitary fluid system, the mating end terminating in a coupling face, the coupling face being adapted to receive a sanitary fluid connector gasket. The quick connect sanitary fluid connector further includes a connector body having an axially extending interior passage, the first sanitary fluid fitting being securable therein, the interior passage being configured for receiving therein of the standard sanitary fluid fitting in abutting relationship with the sanitary fluid connector gasket and the coupling face of the first sanitary fluid fitting. In addition, the quick connect sanitary fluid connector includes a cam locking mechanism including at least two eccentric cams distributed around the connector body and pivotally mounted thereto, the eccentric cams being configured for rotation through respective openings into and out of the interior passage of the connector body, the cams being attached to externally accessible cam operating levers, the cams being shaped so as to apply a pressing force to a rear surface of a flange of the standard sanitary fluid fitting when the cam operating levers are moved to locking positions, thereby pressing the flange of the standard sanitary fluid fitting against the sanitary fluid connector gasket and the coupling face of the first sanitary fluid fitting, so as to form a sanitary fluid connection seal therewith.

In some embodiments, at least a portion of the mating end of the first sanitary fluid fitting is surrounded by external screw threads, and the interior passage of the connector body is configured with internal screw threads sized for engagement with the external screw threads of the first sanitary fluid fitting, the first sanitary fluid fitting being thereby adjustably securable within the interior passage of the connector body by adjustment of the relative rotational orientations of the connector body and the first sanitary fluid fitting. In some of these embodiments the sanitary fluid connector further includes a rotation locking mechanism configured inhibiting adjustment of the relative rotational orientations of the connector body and the first sanitary fluid fitting. And in some of these embodiments the rotation locking mechanism includes a ratchet mechanism which permits adjustment of the relative rotational orientations of the connector body and the first sanitary fluid fitting in one direction, but inhibits adjustment of the relative rotational orientations of the connector body and the first sanitary fluid fitting in the other direction.

Various embodiments further include cam springs, the eccentric cams and the cam springs being configured so as to enable the eccentric cams and cam operating levers to be pushed outward as a result of inserting the standard flanged sanitary fitting into the interior passage of the connector housing, the cam operating levers being automatically returned by the cam springs to their locking positions when the standard sanitary fluid fitting is fully inserted and is in abutting relationship with the sanitary fluid connector gasket and the coupling face of the first sanitary fluid fitting.

In certain embodiments the first sanitary fluid fitting is fabricated of stainless steel. In other embodiments fabrication of the sanitary fluid fitting includes at least one of stainless steel, ceramic, and plastic. And various embodiments include the fluid connector gasket.

In some embodiments the coupling face of the first sanitary fluid fitting includes a semi-circular recess for receiving a raised, semicircular rib on one face of said sanitary fluid connector gasket.

In various embodiments each of the cam operating levers includes a distal element and a proximal element, the distal element and the proximal element being telescopically combined and joined by a spring, the distal element including a catch configured for engagement with a corresponding receptacle attached to the connector housing when the cam operating lever is in its locking position, extension of the spring and telescopic extension of the cam lever being required so as to disengage the catch from the receptacle and move the cam operating lever from its locking position to an open position. Some of these embodiments further include a pair of cam locking holes provided in the distal and proximal elements of one of the cam operating levers, the cam locking holes being aligned when the cam operating lever is in its locking position, and at least one locking clip, the locking clip being attached to the cam operating lever by insertion of the locking clip through a retaining hole provided in the cam operating lever, the locking clip being insertable through the cam locking holes by rotation of the locking clip through the retaining hole without detaching the locking clip from the cam operating lever, thereby preventing telescopic extension of the cam operating lever and preventing movement of the cam operating lever from its locking position to its open position.

In certain embodiments the sanitary fluid connector is configured for operation at up to 150 psi fluid pressure, and testing at up to 450 psi.

Another general aspect of the present invention is a quick-connect sanitary fluid connector for coupling a sanitary fluid system to a flanged standard sanitary fluid fitting. The quick connect sanitary fluid connector includes a connector body having an axially extending interior passage extending from a mating end to a coupling face recessed within the interior passage, the coupling face being adapted to receive a sanitary fluid connector gasket, the interior passage being sized for insertion therein of the standard sanitary fluid fitting in abutting relationship with the sanitary fluid connector gasket and the coupling face. The quick connect sanitary fluid connector further includes a cam locking mechanism including at least two eccentric cams distributed around the connector body and pivotally mounted thereto, the eccentric cams being configured for rotation through respective openings into and out of the interior passage of the connector body, the cams being attached to externally accessible cam operating levers, the cams being shaped so as to apply a pressing force to a rear surface of a flange of the standard sanitary fluid fitting when the cam operating levers are moved to a locking position, thereby pressing the flange of the standard sanitary fluid fitting against the sanitary fluid connector gasket and the coupling face of the threaded sanitary fluid fitting, so as to form a sanitary fluid connection seal therewith.

In various embodiments the fabrication of the sanitary fluid connector includes at least one of stainless steel, ceramic, and plastic. Some embodiments further include the sanitary fluid connector gasket. And in certain embodiments the coupling face includes a semi-circular recess for receiving a raised, semicircular rib on one face of said sanitary fluid connector gasket.

In certain embodiments the sanitary fluid connector further includes cam springs, the cam operating levers and cam springs being configured so as to enable the eccentric cams and cam operating levers to be pushed outward as a result of inserting the standard flanged sanitary fitting into the interior passage of the connector housing, the cam operating levers being returned by the cam springs to their locking position when the standard sanitary fluid fitting is fully inserted and in abutting relationship with the sanitary fluid connector gasket and the coupling face of the first sanitary fluid fitting.

In some of these embodiments each of the cam operating levers includes a distal element and a proximal element, the distal element and the proximal element being telescopically combined and joined by a spring, the distal element including a catch configured for engagement with a corresponding receptacle attached to the connector housing when the cam operating lever is in its locking position, extension of the spring and telescopic extension of the cam operating lever being required so as to disengage the catch from the receptacle and move the cam operating lever from its locking position to an open position.

And some of these embodiments further include a pair of cam locking holes provided in the distal and proximal elements of one of the cam operating levers, the cam locking holes being aligned when the cam operating lever is in its locking position, and at least one locking clip, the locking clip being attached to the cam operating lever by insertion of the locking clip through a retaining hole provided in the cam operating lever, the locking clip being insertable through the cam locking holes by rotation of the locking clip through the retaining hole without detaching the locking clip from the cam operating lever, thereby preventing telescopic extension of the cam operating lever and preventing movement of the cam operating lever from its locking position to its open position.

And in various embodiments the sanitary fluid connector is configured for operation at up to 150 psi fluid pressure, and testing at up to 450 psi.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is susceptible of many embodiments. What is described and illustrated herein is intended to be illustrative, but not limiting of the scope of the invention.

Figure 6:
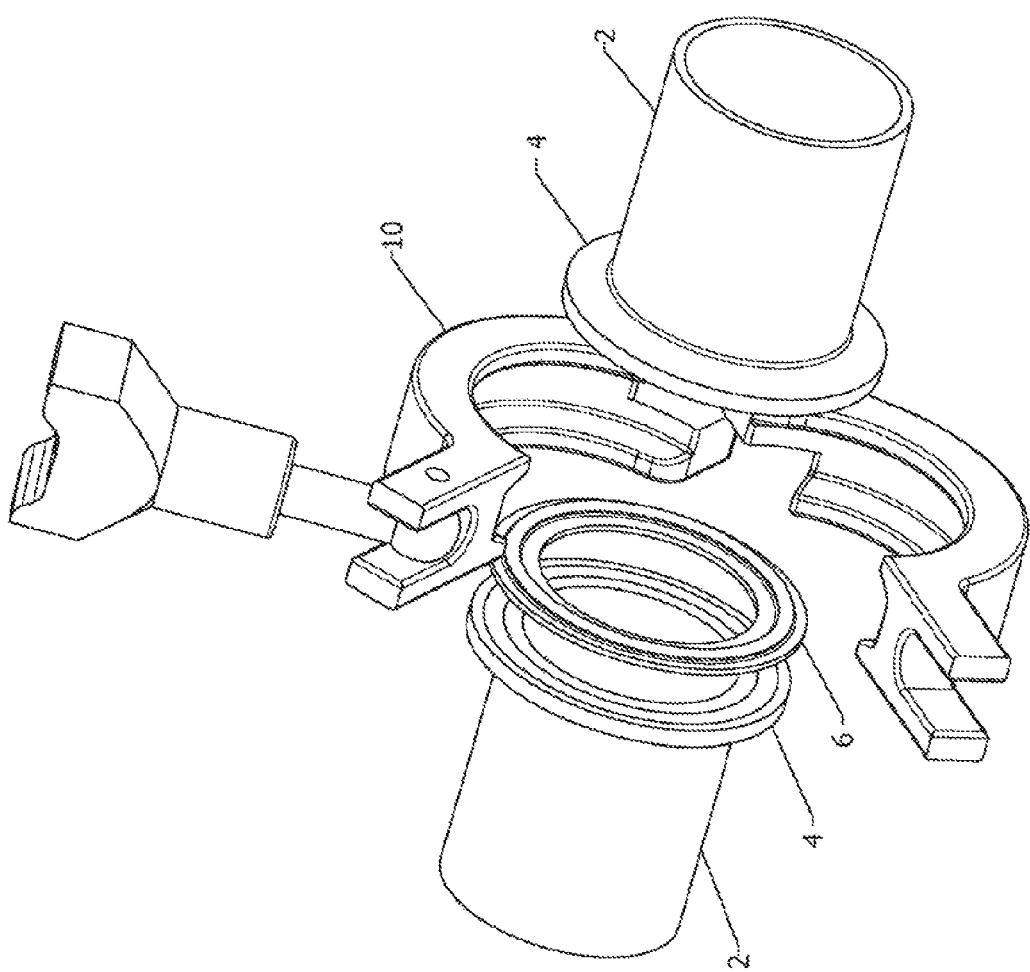
FIG. 6 is a perspective view of a prior art sanitary fluid flow connector, gasket, and two fittings which together comprise a sanitary union.

Referring to FIG. 6, a prior art sanitary connector assembly is shown in an exploded perspective view, wherein two sanitary fittings 2, configured with butt end flanges 4, are joinable face-to-face with a sanitary gasket 6 positioned there between. Gasket 6 has a cross-section profile conforming to the profiles of the coupling faces of sanitary fittings 2. The fittings, with the gasket there between, are clamped and pressed together by their flanges 4 by clamp 10, so as to form a face-to-face compression joint or union. Due to the shapes of the flanges 4 and the clamp 10, the compression pressure applied to the flanges 4 can be increased by tightening the clamp.

Now referring to FIGS. 1-5 generally, the quick connect and disconnect fluid connection system of the present invention in one embodiment has a connector body 100 as shown, which is circular in this embodiment, enclosing a first fitting 150. The first fitting 150 of this embodiment is configured to abut with a coupling face of an externally flanged, industry standard fitting 160 for attachment thereto. Fluid conducted through the fitting may be liquid, gas, or a blend or mix of materials. The fluid may include solids or semi-solids mixed with or in suspension in the fluid. The fluid may be a food, agricultural product, chemical, pharmaceutical product, or other fluid for which sanitary handling or processing conditions are required.

The flanged, industry standard fitting 160 has a very specific, existing structure, its geometry being defined by industry standards for sanitary fittings. It is a flanged sanitary fitting having a substantially flat end or coupling face which may include a gasket recess designed for making a gasketed, butt-joint union with another fitting of similar mating geometry, as with an appropriate gasket or seal and a mating fitting and/or coupler or sanitary fluid connector of the present invention. The terms "first fitting" and "fitting 150" refer herein to a fitting which is included in the present invention, and the terms "second fitting" and "fitting 160" refer herein to an industry standard fitting which is not included in the present invention, but which the present invention is able to connect to. The second fitting conforms to an industry standard geometry for sanitary fittings in its various scaled sizes. Minor variations from the standard or to the standard, such as a small change in the angle of the backside of the flange, or a change to the axial length or wall thickness of the flange, or the introduction of fittings on a larger or smaller scale, are within the scope of the present invention and claims.

Figure 2:
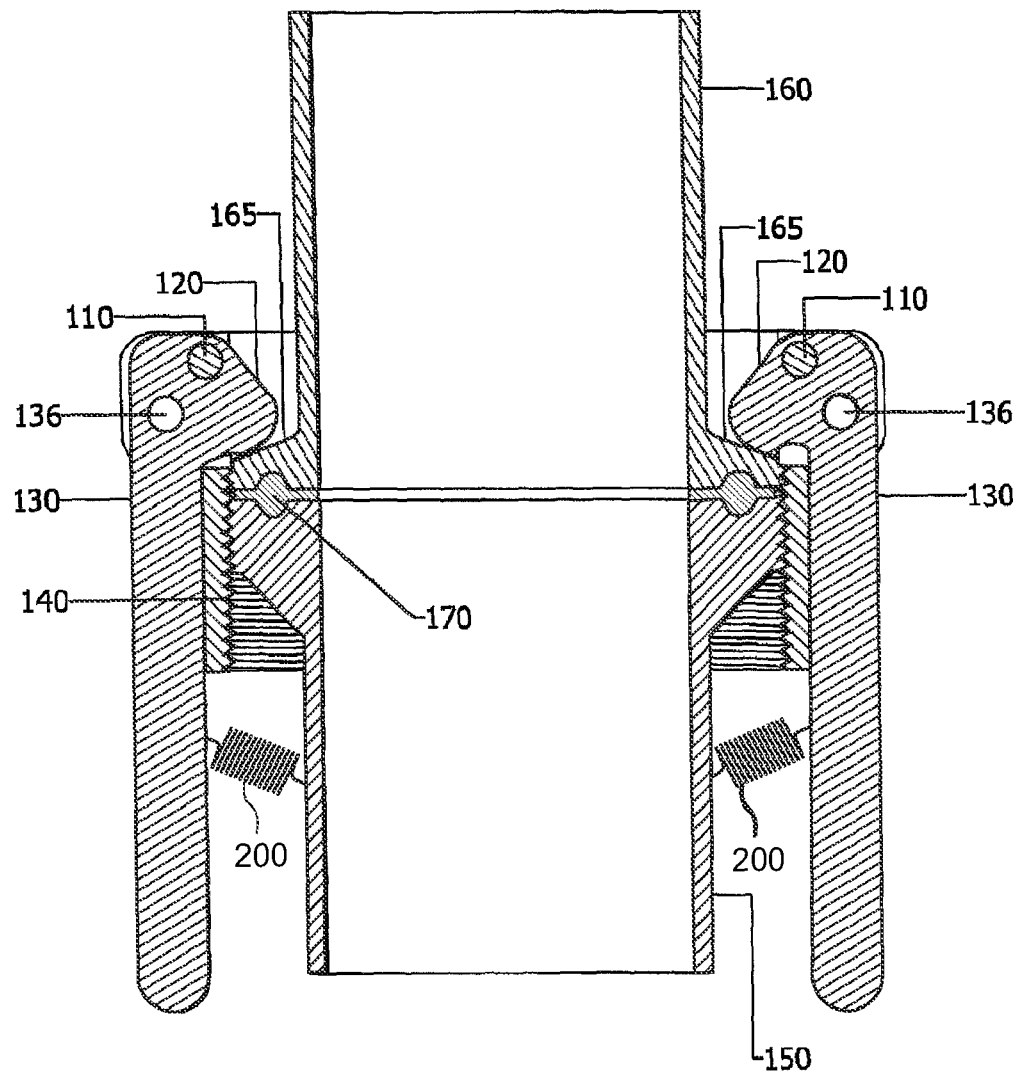
FIG. 2 is a cross-sectional view of another embodiment of the present invention which includes cam lever return springs, shown mated with and coupled to a standard, flanged sanitary fitting.
Figure 3:
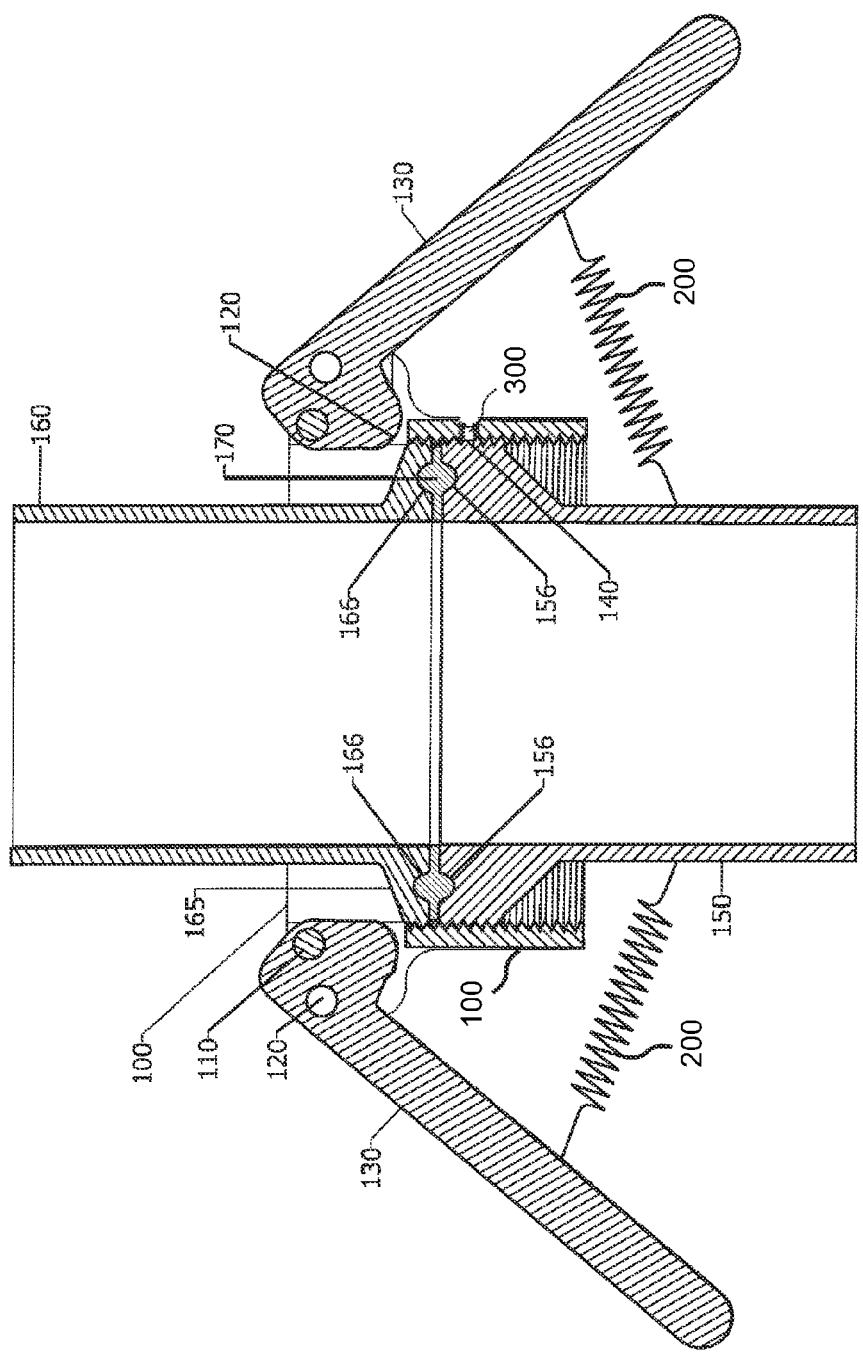
FIG. 3 is a cross-sectional view of the embodiment of FIG. 2 shown mated with the flanged sanitary fitting of FIG. 2 but unlocked and not secured by the cams.

In the embodiments of FIGS. 2 and 3, first fitting 150 is secured within connector body 100 by a threaded connection. Other means of connection are used in similar embodiments between the first fitting 150 and the connector body 100. In some embodiments the back end of first fitting 150 is adapted as by raised ribs or similar means for attachment of a fluid line or hose thereto, commonly secured by a hose clamp or the like. In some embodiments, the back end of the first fitting 150 terminates in a sanitary connector suitable for attachment to a sanitary fluid system. In other embodiments, first fitting 150 is incorporated into an end of a pipe or a manifold, or a fluid vessel of some sort, be it a source, holding tank or repository.

The connector body 100 is configured with two opposing slots 102, which in this embodiment are V-shaped or open ended slots, although in other embodiments they are regular or irregularly shaped holes in the wall of body 100 which are suitable for the purpose described herein. In this embodiment the slots 102 are longer than they are wide, with the longer dimensions axially oriented along the connector body 100. In other embodiments the shapes of the slots or holes vary with the shapes of their associated cam structures. Respective eccentric cams 120 are hingedly installed within or proximate to the slots 102, so that their respect cam surfaces are inwardly exposed for securing engagement with the flange 165 of the second fitting 160. Cam levers 130 extend outboard from the cam hinge line 110 and connector body 100 for manual operation of the cams. In this embodiment two slots 102 and two cams 120 are equally spaced around the circumference of connector body 100. In similar embodiments there are more than two slots and cams having various spacings about the connector body 100.

The eccentric cams 120 and respective cam levers 130 are outwardly rotatable up to about 180 degrees about their respective pivot pins 110 between a closed and locked position with the cam levers 130 lying closely adjacent to the wall of connector body 100, and an open position which is visually distinctive from the closed position, wherein the cam levers 130 range in various embodiments from about 30 or 40 degrees from the sides of the connector body 100 to generally orthogonal or more, up to 180 degrees from locked, where they may lie adjacent to second fitting 160 when coupled thereto, depending on the geometry of the cam mechanism.

The travel of cam levers 130 may be intentionally limited to or have an operating range of less than 180 degrees. Their range of motion may be biased by springs and/or detents of one kind or another so as to retain them in a preferred open or closed position. In the embodiment of FIGS. 2 and 3, springs 200 are included which bias the cam levers 130 to return to their closed positions when released. In some embodiments, the pivot pins 110 are separate components which are installed through hinge pin holes in cams 120 and secured within hinge pin supports 114 on either side of respective slots 102. In other embodiments, the pivot pins 110 are shaft-like extensions which are integral to and extend from each side of each cam 120 into the hinge pin supports. Other common means of hingedly securing a rotational component to a body in the manner of attaching cams 120 to body 100 so as to operate within and through slots 102 are within the scope of the present invention.

In the embodiments of FIGS. 1-5, locking holes 106 are provided in supports 114 and corresponding locking holds 136 are provided in cam levers 130, for securing cam levers 130 in their locked or coupled positions. Variously positioned locking holes and/or other means for securing the levers 130 in a desired position are included in similar embodiments.

When in use, embodiments of the present invention include a body 100 mated to a fitting 150, installed on one end of a flexible fluid tube or line (not shown) with the desired axial adjustment or pre-adjustment depth of fitting 150 set within body 100 so as to result in a desired amount of compressive closing force on the flanged end of the selected second sanitary fitting. Prior to connection, in some embodiments, cam levers 130 will be folded against body 100 as in FIGS. 1 and 2, with their ends extending axially in the direction of fitting 150, and cams 120 will protrude into the interior of body 100 through slots 102. In some embodiments, the sanitary quick connector cannot be mated to a sanitary fitting 160 until the cam mechanism is manually opened. In other embodiments, the incoming flange of the second fitting pushes the cams open until the flange 165 of the second fitting 160 is past the cams and is abutted against the sanitary gasket and first fitting, after which the cams can be closed by the previously described normal cam lever action closing motion, so as to bring compression to the abutted joint.

In the former instance, to prepare the coupling 150 of the invention for mating with standard fitting 160, cam levers 130 must be rotated to the open position, so as to retract the eccentric cams 120 from the interior volume of the connector body 100 and allow or provide sufficient clearance for the external flange 165 on the end of fitting 160 to be inserted into the connector body to form a butt joint with first fitting 150. In the later instance, the cam levers 130 will simply be rotated open as the cams 120 are pushed outward by incoming flange 165. In some embodiments cam levers 130 in the open position will be at least 30 degrees away from their closed position against connector body 100, and in some embodiments will be between 30 and 180 degrees away, with ends extending generally towards second fitting 150, depending on the design details of the specific embodiments. Further, as illustrated in FIGS. 2 and 3, in some embodiments the cams 120 are spring loaded so as to open and receive the flange 165 of a sanitary second fitting 160 during a coupling action, and return by spring pressure to the closed position once the flange 165 of the second fitting is within the grasp of cams 120.

The butt joint interface is prepared in advance of closing the cams 120 with an industry standard sanitary seal or gasket 170. As described above, the seal or gasket may be a single or multiple component device, and may have been installed or pre-positioned on the coupling face of either or both fittings 150 and 160 prior to making the connection.

Still referring to the embodiment of FIGS. 2 and 3, closure of cam levers 130, whereby the levers are rotated with respect to connector body 100 in the direction of attached fitting 150, brings eccentric cams 120 into axially compressive contact with the back side or cam contact side of flange 165 of second fitting 160, so as to secure the butt joint with sufficient axially compressive force to form and maintain the integrity of the butt joint seal against a maximum industry standard working fluid pressure, which in typical applications for sanitary fittings is about 80 psi (pounds per square inch). Higher and lower pressures may be accommodated by the invention, using appropriate design criteria.

The geometry of the eccentric cams provides for an "over center" cam surface contact with flange 165, when rotated to the closed position, by which the resistance of the joint and seal to the compression tends to hold the cams 120 and cam levers 130 in their closed position.

Referring to FIG. 2, there is depicted a cross-sectional view of one embodiment of the invention with cams 120 shown in their locking or coupled position. As in FIG. 1, connector body 100 is shown securing first fitting 150 and second fitting 160. A sealing gasket 170 is shown between the abutting ends of the two fittings. In various embodiments, the gasket is replaced or supplemented by other sealing means. Fitting 150 is retained within body 100 by threaded section 140, which consists of external threads on fitting 150 which are compatible with internal threads on body 100. The threaded section 140 provides for pre-setting and/or final adjustment of the depth of fitting 160 within body 100, which affects the cam locking compression.

As illustrated in FIG. 3, a lock nut, set screw 300, or other common means is provided in some embodiments so as to secure the adjustment of depth of fitting 150 in body 100, either before or after the coupling is locked onto a second fitting. In other embodiments, the threads are replaced by other attachment mechanisms. These include, but are not limited to, one or more projections from the interior surface of the connector body. Projections may be or may include a raised rim or rib portion, or one or more pins or screws. Various of these attachment means do or do not provide for adjustment to the length or depth of insertion of fitting 150 into body 100, by which a pre-set or final adjustment for the butt joint compression can be accomplished.

Figure 1:
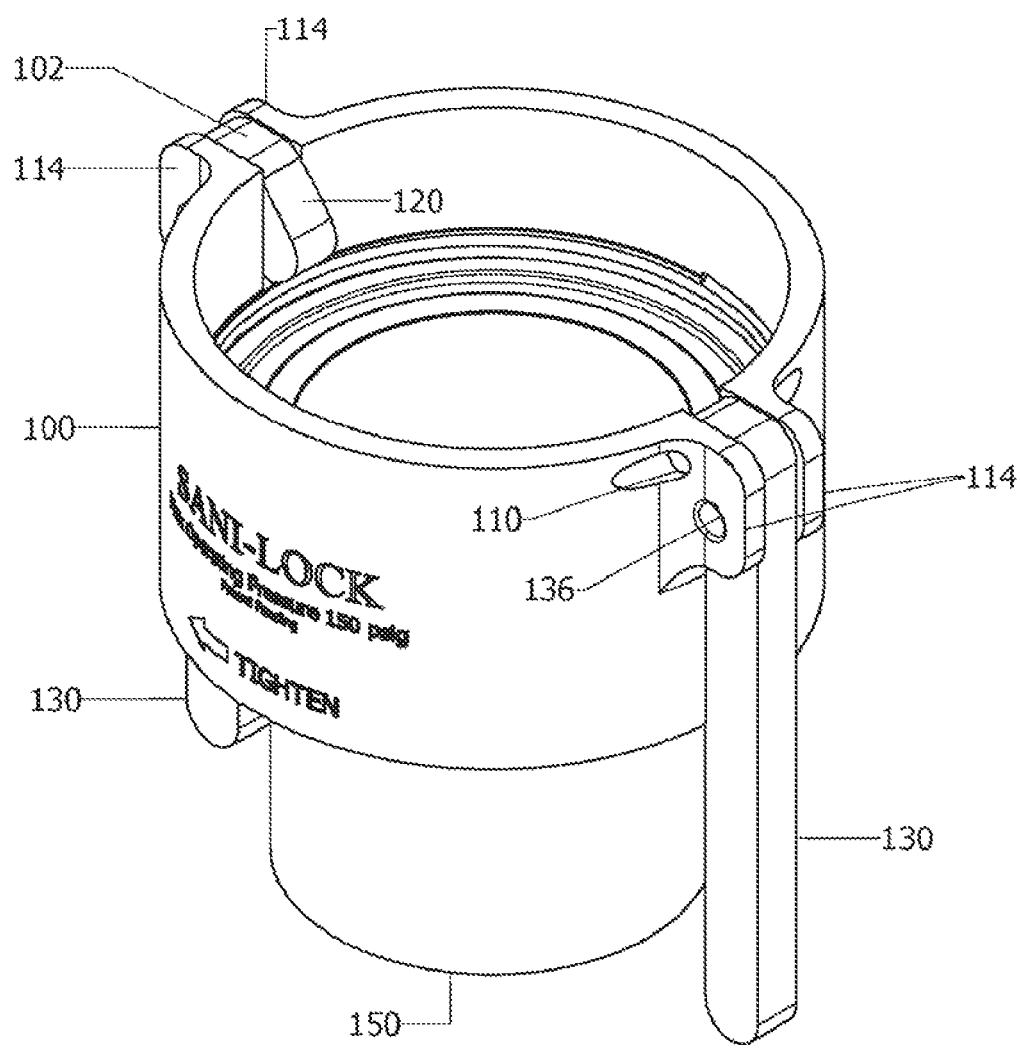
FIG. 1 is a perspective view of an embodiment of the present invention showing the cam levers and cams in their coupled or locked position.

Referring again to FIG. 2, as in the embodiment of FIG. 1, eccentric cams 120 and cam levers 130 rotate about pivot pins 110 to secure eccentric cams 120 against the back side of a flange 165 of second fitting 160. The cam levers 130 are illustrated in FIG. 2 in their closed position. Some embodiments include a supplemental means to secure each or all of the cam levers in the closed position, so as to avoid unintentional or accidental release of one or more cams. The embodiment of FIG. 2 includes lever latch holes 136 corresponding with connector latch holes 106, which come into alignment when the cam levers 130 are moved to their closed position, and through which a locking pin can be inserted so as to lock the cam levers 130 in their closed position. Many other securing mechanisms are possible and all are within the scope of the present invention. For example, in some embodiments a sliding collar (not shown) is slipped forward from or on first fitting 150 so as to surround and enclose the distal ends of the cam levers 130. In other embodiments, a simple strap, hook, pin, catch, or other common keeper (not shown) for each cam lever 130 connects the levers 130 to the coupler body 100, first fitting 150, or to a tube installed on the first fitting 150. In still other embodiments, a strap is wrapped around the coupler, first fitting, and all of the cam levers 130, and secured by a snap, clip, or hook-and-loop fastener material so as to hold the cam levers 130 in their closed or locked position.

Referring now to FIG. 3, there is illustrated a cross sectional view of the embodiment of FIG. 2, depicted with cams 120 in an unlocked position such that a second sanitary fitting 160 can be inserted therein or withdrawn there from. As in FIGS. 1 and 2, connector body 100 of this embodiment is shown engaged with first fitting 150 and joining it to second fitting 160. A single sealing gasket 170 is located between the flanges of the respective fittings 150, 160. The cross section of gasket 170 includes an industry standard circular section in this embodiment, but other cross sections are within the scope of the invention. The circular section of industry standard gasket 170 is illustrated as confined within matching semicircular recesses 156 and 166 set into the coupling face of each fitting 150, 160. Fitting 150 is retained within body 100 by threaded portion 140. Cam levers 130 rotate about pivot pins 110 to secure eccentric cams 120 against the backside of flange 165 of second fitting 160. Springs 200 are extended when the cam levers 130 are in their open position, so that the cam levers 130 must be held open, and will return to their closed position when released. FIG. 3 further includes a set screw 300 which can be tightened so as to inhibit rotation of the first fitting 150 relative to the connector body 100, and thereby fix the compression force of the sanitary connection when the cam levers 130 are moved to their closed positions.

It should be further apparent from FIG. 3 that because the sanitary quick connector and the second fitting are both round, in accordance with industry standards, there is no required rotational orientation of the connector body 100 with respect to the fitting 160 to which it is being coupled. The cams will lock on to the flange 165 of the second fitting 160 irrespective of rotational orientation. Furthermore, until the set screw 300 is tightened, the connector body 100 can be rotated with respect to the first fitting 150 during or after the connection is established and locked, with the cams 120 sliding along the backside of the flange 165. Cams 120 in some embodiments are configured at their cam contact end with roller or ball tips (not shown) which bear as bearings on the backside of flange 165, so as to facilitate either or both the cam locking action and the ease with which the connector body 100 can be rotated on the fitting with less abrasion or wear to the backside surface of flange 165 or to the surfaces of the cams 120, as when adjusting the compression.

It should also be readily apparent to those skilled in the art that keying between the sanitary coupler of the present invention and the industry standard fitting or fittings to which it will be coupled can be provided by several common means such that one or more rotational orientations of the connector body relative to the second fitting is/are required, or conversely, must be avoided. The keying structure can be external or internal to the connector body, and integral to or external of the fitting to which it will be coupled.

Figure 4A:
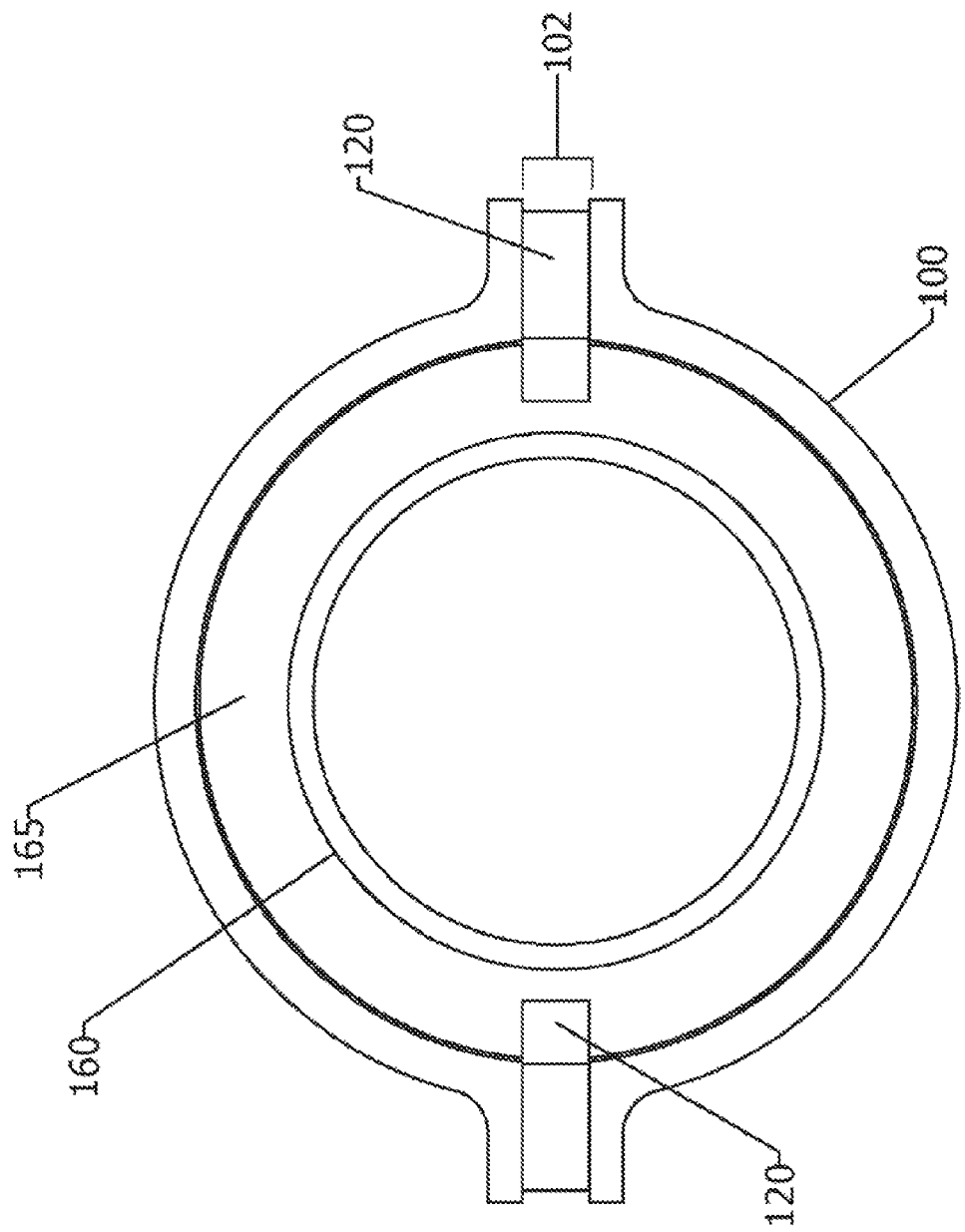
FIG. 4A is an axial view of an embodiment of the present invention, shown looking through the sanitary fitting to which it is coupled.

Referring now to FIG. 4A, there is illustrated an end view of a connector body 100 of an embodiment of the invention configured with two cams 120 arranged 180 degrees apart on the connector body and coupled to a second fitting 160, so that the cams 120 extend over and pull on the backside of flange 165 of the second fitting. It should be noted that in other embodiments there are more than two cams 120, and that in some of these embodiments the cams 120 are equally spaced about the connector body 100, while in other embodiments the cams 120 are unequally spaced about the connector body 100.

Figure 4B:
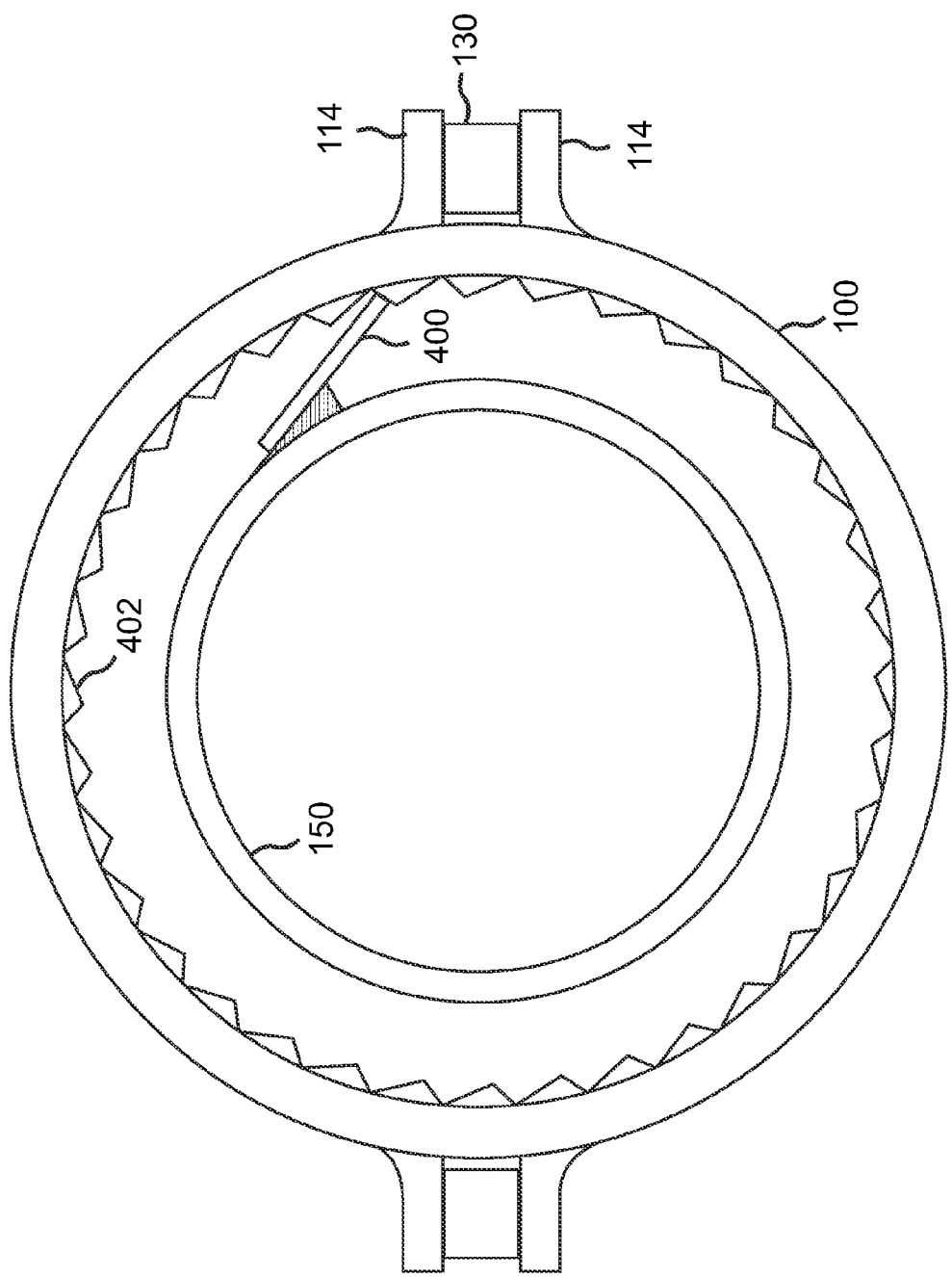
FIG. 4B is an axial view of the embodiment of FIG. 4A illustrated from an opposite direction, showing a ratchet mechanism configured to allow rotation of the fitting within the body so as to increase pressure on the sanitary gasket, while inhibiting counter-rotation which would decrease pressure on the gasket.

FIG. 4B is an end view of the embodiment of FIG. 4A shown from a direction opposite to the view of FIG. 4A. A ratchet action mechanism is included in the embodiment which includes a stop lever 400 attached to the first fitting 150, the stop lever being configured to engage a series of ratchet teeth 402 extending from the inner surface of the connector body 100. The ratchet mechanism accepts advancing rotation of first fitting 150 relative to connector body 100, but prevents counter rotation of first fitting 150 relative to connector body 100 unless or until the ratchet mechanism is released by bending stop lever 400 away from ratchet teeth 402.

Figure 5:
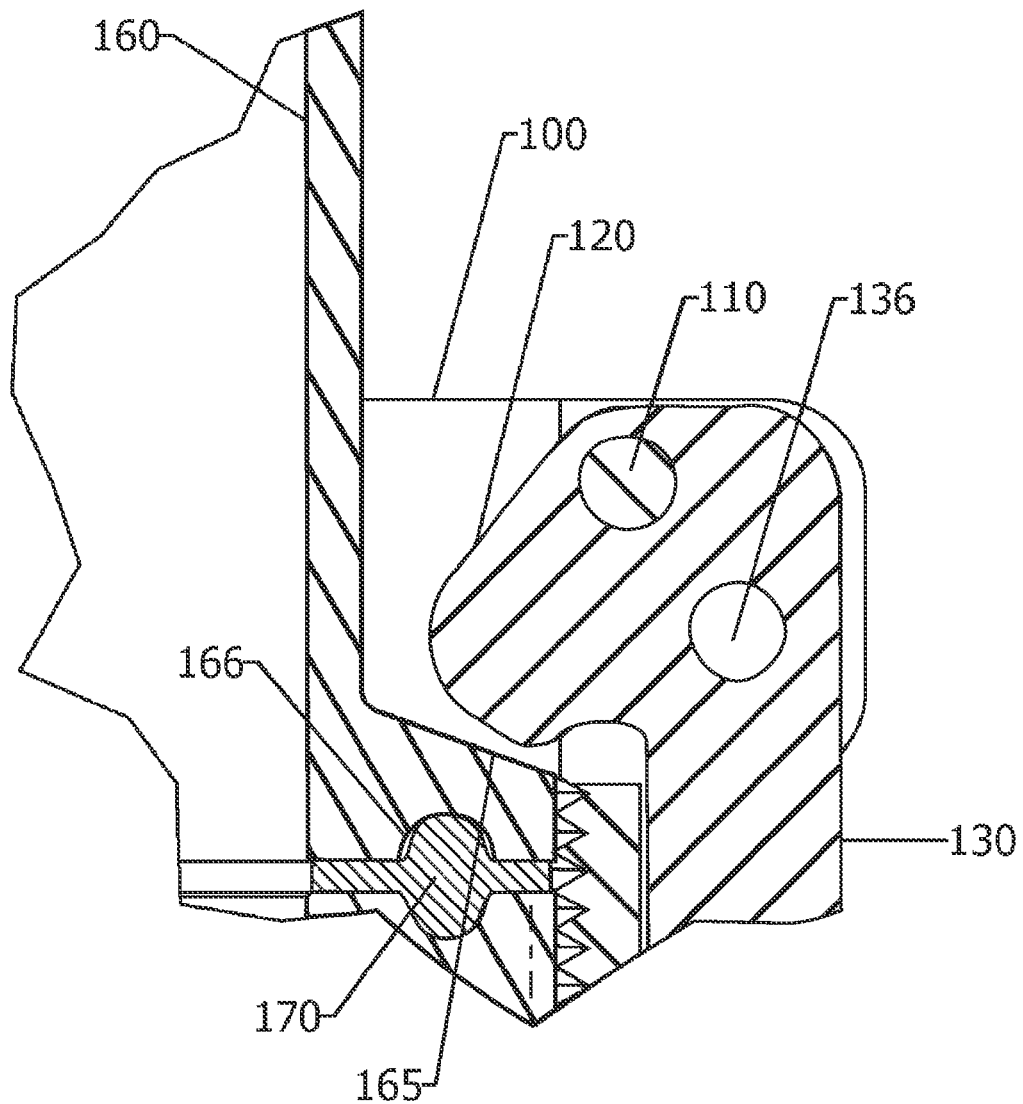
FIG. 5 is a close-up view of a cam mechanism of an embodiment of the present invention shown locked onto the flange of a standard flanged sanitary fitting.

Referring now to FIG. 5, there is illustrated a detail sectional view of a cam of an embodiment of the present invention shown in a locked position over the flange 165 of a standard sanitary fitting 160. As in previous figures, connector body 100 is shown enclosing flange 165 of second fitting 160. A portion of sealing gasket 170 is also shown. Cam lever 130 rotates about pivot pin 110 so as to secure eccentric cam 120 against flange 165 of second fitting 160, thereby applying compressive force to the sanitary connection.

In some embodiments of the present invention each cam lever 130 includes a latching mechanism which automatically latches the cam lever 130 in its locked position whenever it is placed there, and holds the cam lever 130 in the locked position until released. The latching mechanism can be configured to release each cam lever 130 independently, or to release all of them collectively. FIGS. 7-10 illustrate an embodiment of the present invention in which each of the cam levers 130 comprises a pair of telescoping elements 130A, 130B connected by a spring (not shown) which tends to minimize their length but which can be easily extended by pulling on the distal element 130A. For each cam lever 130, a catch 702 is included at a proximal end of the distal element 130A which is configured to engage a compatible notch 704 provided in the pivot supports 114 when the cam lever is moved to its locked position. The catch 702 and notch 704 are configured so as to cause the telescoping cam lever 130 to automatically expand and engage the catch 702 with the notch 704 as the cam lever 130 is moved to the locked position. However, once the catch 702 is engaged with the notch 704, the cam lever 130 cannot be moved away from its locked position unless the distal element 130A of the cam lever 130 is grasped and pulled away from the proximal element 130B of the cam lever.

Figure 7:
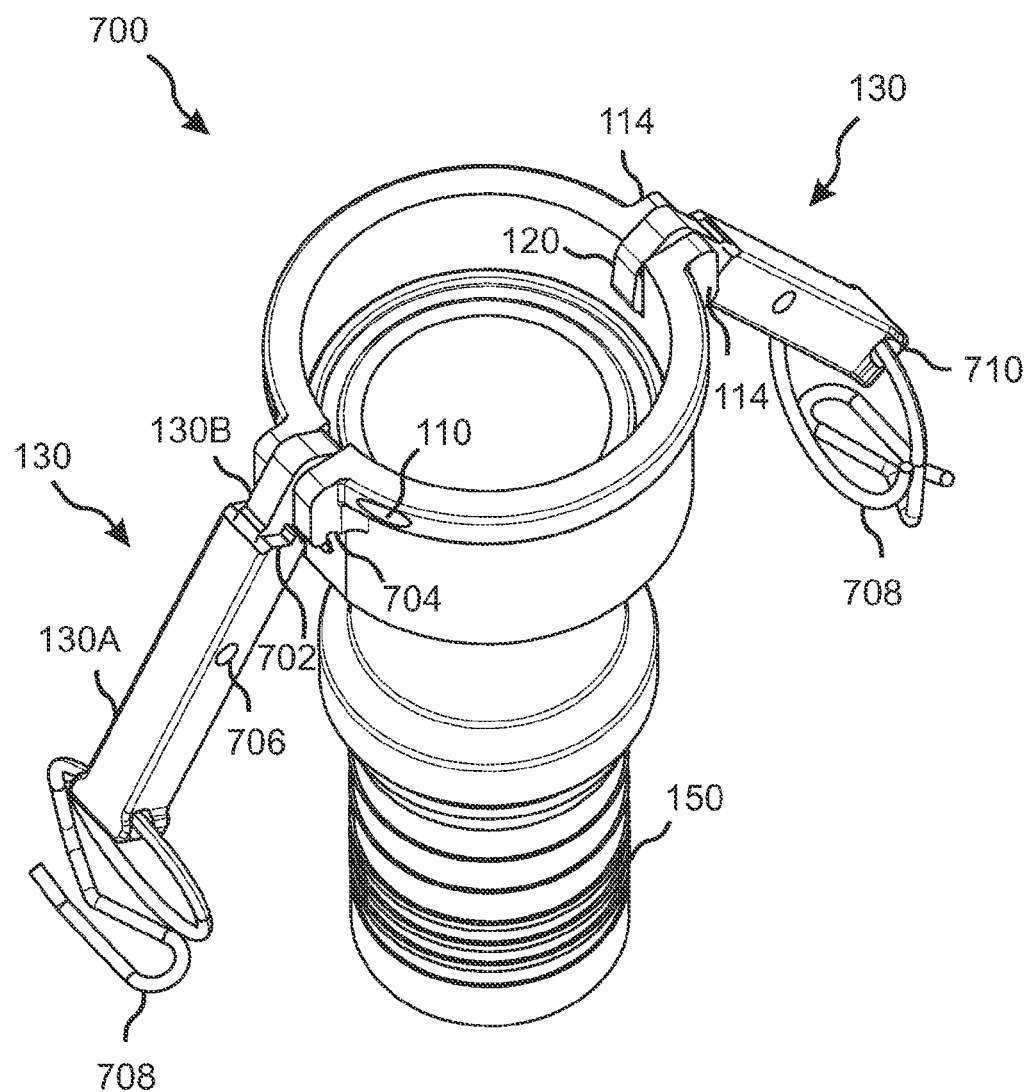
FIG. 7 is a perspective view from above showing an embodiment of the present invention which includes telescoping cam levers and retained locking pins, showing the cam levers in their unlocked positions.

Overlapping locking holes 706 are provided through the distal 130A and proximal 130B elements of each cam lever 130, so that a pin can be inserted through the overlapping holes 706 when the lever 130 is in its locked position. This prevents the cam lever 130 from telescopically expanding, and thereby maintains the cam lever 130 in its locked position. In the embodiment of FIG. 7, a locking pin 708 is attached to a retaining hole 710 provided in the distal element 130A of each cam lever 130. The locking pin 708 can be inserted into the locking hole 706 simply by rotating a ring-shaped portion of the locking pin 708 through the retaining hole 710, with no need to separate the locking pin 708 from the cam lever 130.

Figure 8:
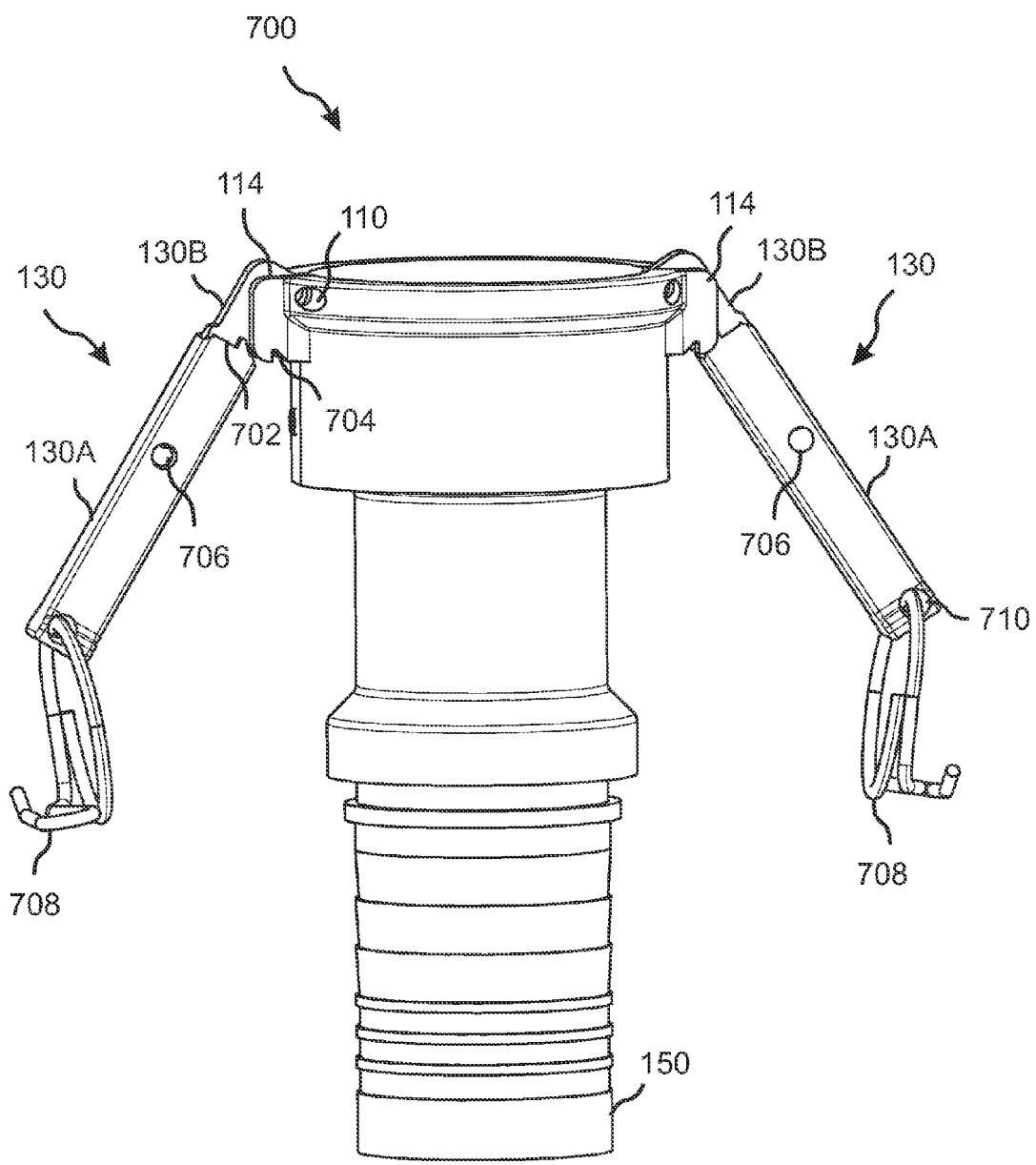
FIG. 8 is a side view of the embodiment of FIG. 7.
Figure 9:
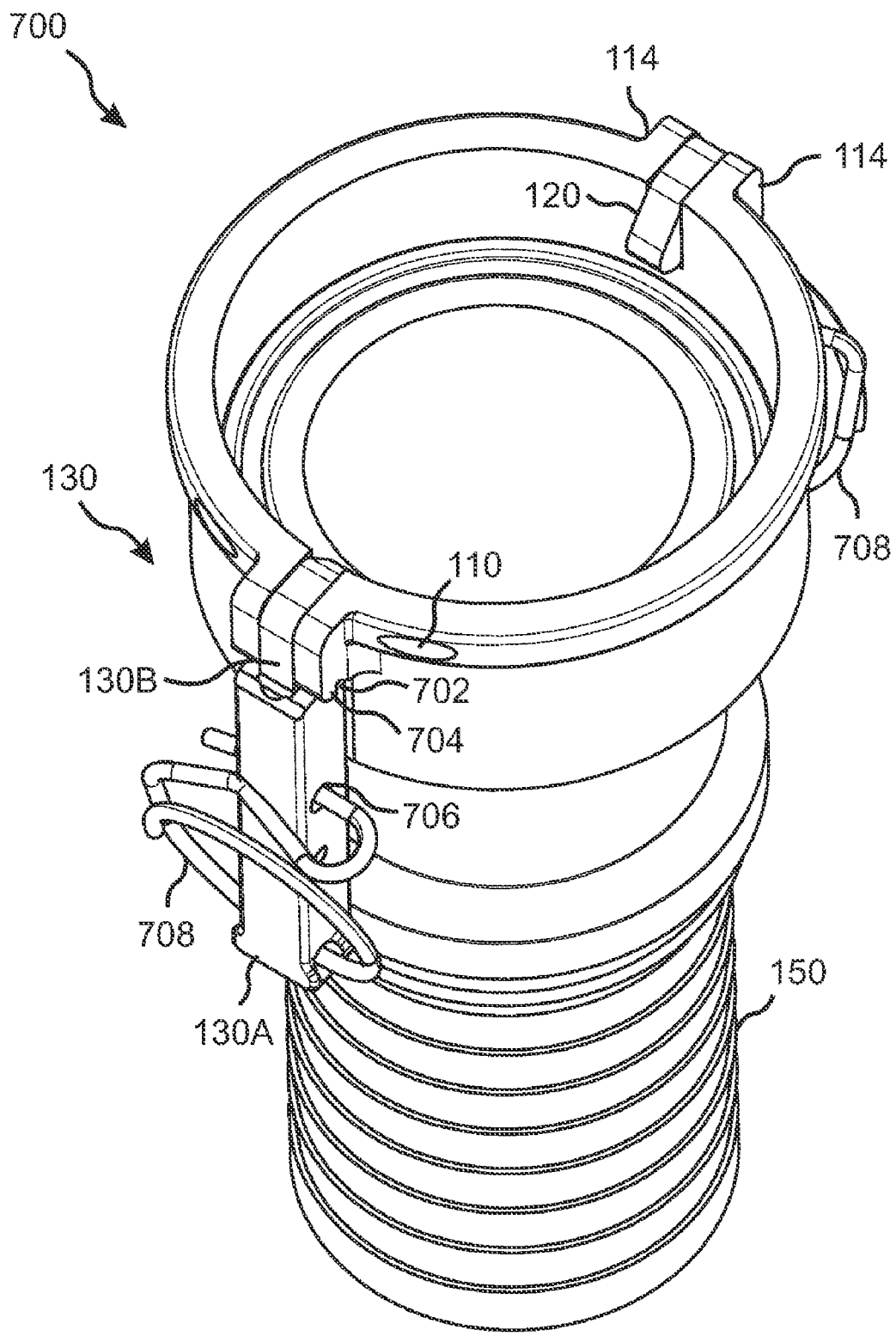
FIG. 9 is a perspective view from above of the embodiment of FIG. 7, showing the cam levers in their locked positions.
Figure 10:
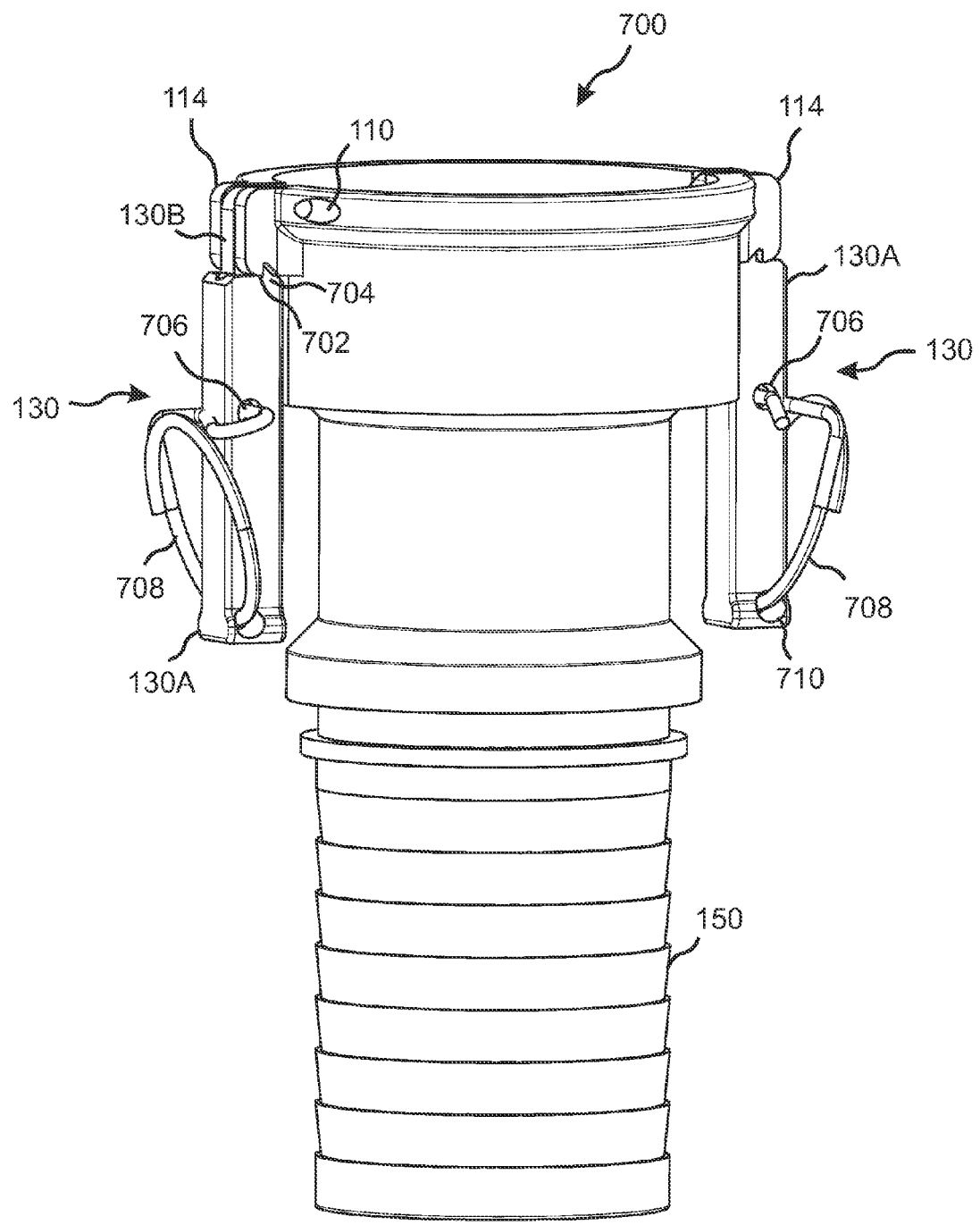
FIG. 10 is a side view of the embodiment of FIG. 9.

FIG. 8 is a side view of the embodiment of FIG. 7, with the cam levers 130 shown in their open positions. FIGS. 9 and 10 are a perspective view from above and a side view respectively of the embodiment of FIG. 7 shown with the cam levers 130 in their locked positions, the locking pins 708 being inserted into the locking holes 706.

Figure 11B:
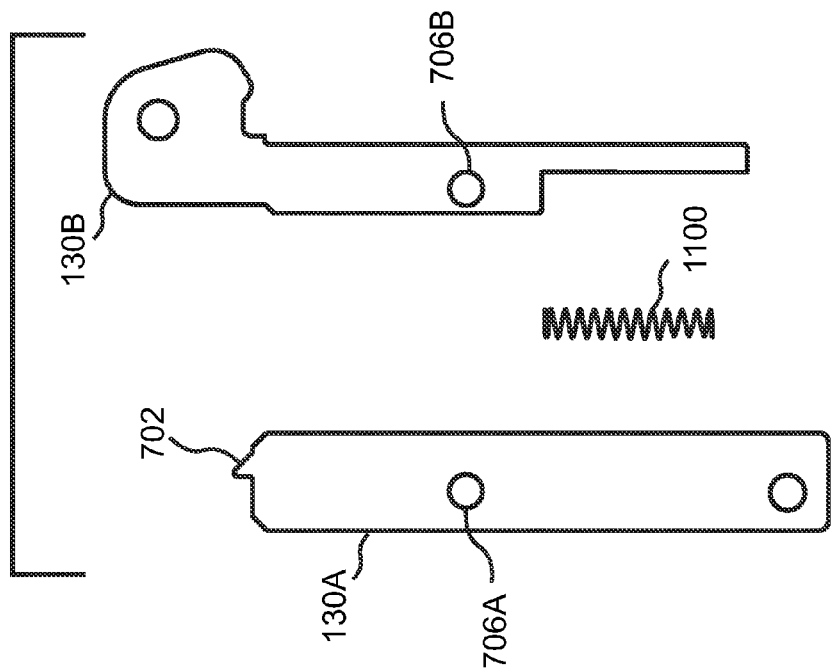
FIG. 11B is an exploded side view of the pair of telescoping elements and spring of FIG. 11A.
Figure 11A:
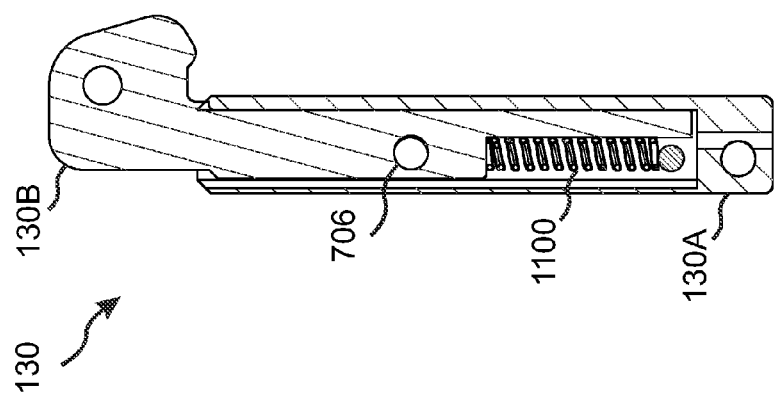
FIG. 11A is an assembled, cross-sectional view of a cam lever comprising a pair of telescoping elements connected by a spring.

FIG. 11A presents a cross sectional view of an assembled cam lever 130 in an embodiment where the cam lever 130 includes distal 130A and proximal 130B elements connected by a spring 1100 which tends to minimize the length of the cam lever 130, but allows extension of the cam lever length by pulling on the distal element 130A. FIG. 11B is a side view of the disassembled distal 130A and proximal 130B cam lever elements of FIG. 11A, showing the separate locking holes 706A, 706B provided in each element 130A, 130B respectively. When the cam lever 130 is assembled and the locking holes 706A, 706B are aligned, as shown in FIG. 11A, a pin 708 can be inserted through the aligned locking holes 706 so as to prevent extension of the cam lever.

Other and various embodiments are within the scope of the invention. For example, the opposing faces of the butt joint of the connection can be planar or conical, and can have or not have matching profiles. A mismatch of coupling face profiles can be accommodated by a conforming or conformable gasket. One or both coupling faces of the mating fittings can have a circular recess or a rectangular or semi-circular profile, or be otherwise keyed or configured so as to accept the placement of a suitable seal or gasket of desired material, profile, and thickness. The gasket profile can by designed to accommodate non-matching coupling surface profiles, as for example by incorporating the equivalent of an "a-ring" in an otherwise flat gasket profile which matches a corresponding semi-circular groove in the coupling face of each fitting end.

The interface geometry of the first fitting 150 and connector body 100 requires sufficient wall thickness of the fitting and of the connector body to support their connection, in whatever form it takes. For example, for a threaded section, screw-type interface as illustrated, the wall thicknesses must allow for their respective thread depth or cut, as well as supporting the connection forces and the maximum allowable fluid line pressure. A threaded interface design must also include consideration of an appropriate thread size, pitch, and number of turns in the connector body for axial engagement and for a useful range of compression adjustment relative to a unit of rotation of the connector body 100 with respect to the first fitting 150. Also, first fitting 150 must have a minimum acceptable number of threads or turns by which the first fitting 150 will be properly supported within the connector body 100.

In various embodiments the threaded connection between connector body 100 and first fitting 150 provides for adjustment of the compression force on the union or joint with the flanged second sanitary fitting 160 by rotating the first fitting 150 with respect to the connector body 100, or alternatively, rotating the connector body 100 with respect to the first fitting 150. In a keyed embodiment wherein the connector body 100 is keyed to the second fitting 160, and the second fitting 160 is installed in or extends from a stationary manifold of some type so as to be resistant to manually applied rotation forces, the connector body 100 cannot be rotated with respect to the second fitting 160 when coupled to it. In such cases, joint compression may be adjusted after the fluid connection is made by rotating the first fitting 150 and attached hose, assuming sufficient flexibility, within the connector body 100 to a torque level representative of an appropriate compression force on the seal or gasket 170.

In some embodiments, first fitting 150 is pre-positioned at the correct depth within connector body 100 for making a connection or coupling of nominally acceptable compression to an industry standard second sanitary fitting 160. The connection is then made and the compression is adjusted as described above. Alternatively, the rotational pre-set adjustment may be locked with a locking set screw 300 or locking nut (not shown) or other means to avoid further manual rotation affecting compression during normal use of the quick connector. All means known in the art for rotationally locking the connector body 100 to the first fitting 150 after the final, post coupling compression adjustment are included in the scope of the present invention.

Referring to the figures and restating the above adjusting means, in some embodiments, after a rotational pre-set for compression is made and after the connection with second fitting 160 is established and the cam levers 130 are swung to their locked positions, a final rotational adjustment of first fitting 150 can made with respect to connector body 100, or vice versa, so as to achieve a desired amount of torque equated by the operator to a desired amount of compressive force on the connector seal or gasket 170.

There may also be a slide lock, clip, pin, locking ring or screw 300 or locking pall (not shown) or other mechanism associated with the connector body 100 and first fitting 150 which is easily set after the final rotational adjustment so as to prevent further rotation of the first fitting 150 in one or both directions within the connector body 100. In the embodiment of FIG. 3, for example, a set screw 300 is installed in a threaded hole in the connector body 100, and can be adjusted so as to press upon the threaded portion of the first fitting 150, thereby preventing rotation of the first fitting 150 relative to the connector body 100. A ratchet action mechanism which accepts advancing rotation of fitting 150 but prevents counter rotation within body 100 unless or until it is released is within the scope of this aspect of the invention. An example is presented in the embodiment of FIG. 4B, which includes a stop lever 400 attached to the first fitting 150, the stop lever being configured to engage a series of ratchet teeth 402 extending from the inner surface of the connector body 100.

In an alternative, unitary embodiment wherein the first fitting 150 and connector body 100 are integrated, accepting by definition that fluid will contact the interior wall of the connector body in this case but is otherwise normally contained, the connector body 100 can incorporate a permanent abutting flange or coupling surface for the face-gasket-face union connection to flange 165 of the second fitting 160. The connector body 100 can further incorporate a short nipple or tubular tailpiece extension or structure 150 to which a hose or tube can be attached by a hose clamp or other common means, or to which a compression or other type union or pipe joint can be used to join it to a further length of fitting, pipe, or hose, or otherwise connect it to a fluid distribution system or container. In this embodiment, the cams 120 and the supporting structure are integral to the connector body, but external to the fluid flow or fluid channel when the fluid connection is established. In these embodiments the cam mechanism can provide for cam action adjustment by limiting rotation of the cam 120 or by adjusting the point of rotation, thereby affecting the joint compression force.

With respect to the second, industry standard fitting 160, the strength and rigidity of the second fitting 160, and in particular its flange 165, is relied upon to extend the contact point pressure of the two or more eccentric cams 120 on flange 165 uniformly around the gasket 170 and the joint generally, so as to maintain joint integrity when the conveyed fluid is pressurized. As noted with respect to the first fitting 150, the second fitting 160 can likewise or in the alternative be or include a connection to a fluid distribution system or container.

Although two eccentric cams 120 and cam levers 130 on connector body 100 are illustrated in several embodiments for locking down flange 165, a greater number of eccentric cams 120 and cam levers 130 distributed about the connector body 100 can be employed. In all embodiments, the pivot pins 110 or mechanisms on or by which the cams are rotated are designed to bear the forces relating to the design limits for exerting the maximum desired force of compression, as well as accommodating the rotational functionality required of the cam levers 130 for locking and unlocking the connection.

In possible variations to the otherwise industry standard second fittings 160, flange 165 may comprise or be configured with a pair or series of formed flange segments or locking recesses which are radially spaced about the butt end of second fitting 160, whereby connector body 100 is rotationally adjusted to align the cams with the locking recesses during connecting operations, and the connection is then formed and locked in the manner described above.

The invention is susceptible of other and numerous embodiments, variations and applications. As an example, there are connectors for the transfer of fluids, including various liquids, air, steam, and other process gases. Such connectors can consist of a body having an interior surface defining an axially extending passage between a first end and a second end of the body, where the passage is sized so that one end of a first fluid conductor and one end of a second fluid conductor can be disposed within the passage with a sealing material disposed between them, thereby forming a circular butt joint relationship between the fluid conductors so as to permit fluid flow there between without contacting the connector body. There may be a fastening means whereby a depth of insertion of the first fluid conductor within the body may be adjusted and the first fluid conductor secured within the body. There may be a sealing material formed and sized as a gasket or seal that mates with the respective abutting ends of the fluid conductors. And it may include a cam locking mechanism that includes at least two eccentric cams uniformly distributed around the body and pivotally mounted on or to the body with externally accessible cam levers whereby the second fluid conductor can be inserted and locked by cam action within the passage of the body in compressive contact with the sealing material and hence with the first fluid conductor.

As another example, there is a sanitary fluid connector for coupling a sanitary fluid system to a flanged sanitary fluid fitting that includes a first sanitary fluid fitting having a mating end configured with external screw threads and a coupling face. The coupling face is further adapted to receive a sanitary fluid connector gasket and be mated to a flanged sanitary fluid connector. The first fitting has a back end adapted to accept attachment to a sanitary fluid system which might be or include a fluid hose or line, or a fluid reservoir or source or pump, or a fluid manifold further connected to a fluid source or such.

The connector also includes a connector body with an interior surface defining an axially extending passage between a back end and a coupling end of the body, where the passage proximate the back end of the body is sized and configured with threads by which the mating end of the first sanitary fluid fitting may be adjustably engaged within the passage to a selected depth by rotation of the body with respect to the first sanitary fluid fitting. The coupling end of the connector body is configured with a cam locking mechanism that includes at least two eccentric cams uniformly distributed around the body and pivotally mounted on the body for rotation through respective slots into and out of the passage. The cams are configured with externally accessible cam operating levers, whereby a mating flange on a flanged second sanitary fluid fitting of the type described previously may be locked by operation of the cams to create a sanitary fluid flow path or connection with the first sanitary fluid fitting.

The body may be fabricated of stainless steel. The connector or parts of it may be fabricated of at least one of a group of materials consisting of stainless steel, ceramic, and plastic material, each of which is known to those skilled in the art to have useful properties for a device of this nature. And the flat face of the first sanitary fluid fitting may have a semi-circular recess for receiving a raised, semicircular rib on one face of a sanitary fluid connector gasket.

As yet another example, there is a sanitary fluid connector for coupling a sanitary fluid system to a flanged sanitary fluid fitting that includes a first sanitary fluid fitting having a mating end configured with a flat face, the flat face further adapted to receive a sanitary fluid connector gasket and be mated to a flanged sanitary fluid connector, and a back end adapted to accept attachment to a sanitary fluid system. It also has a connector body having an interior surface defining an axially extending passage between a back end and a coupling end of the body, where the passage proximate the back end is sized and configured with any common means for receiving and securing the mating end of the first sanitary fluid fitting therein, which might be any of adhesives, press fit, spring washer, any of several types of common fasteners including pins, screws, and locking flanges. The coupling end of the connector body is configured with at least two eccentric cams pivotally mounted thereon for rotation through respective slots into and out of the passage, at least two of the cams configured with externally accessible cam operating levers.

Any of the above examples may include means for locking the first sanitary fluid fitting within the passage in the connector body so as to inhibit further rotational adjustment or other relative movement.

As still another example, there is a sanitary fluid line connector for coupling a sanitary fluid system to a flanged end sanitary fluid fitting, consisting of a connector body configured with an interior surface defining an axially extending passage between a back end and a coupling end of the connector body, where the back end is adapted to accept attachment to a sanitary fluid system, and the passage is configured with a flat face further adapted to receive a sanitary fluid connector gasket and be mated to a flanged sanitary fluid connector received through the coupling end of the connector body. The coupling end of the connector body is configured with a cam locking mechanism including at least two eccentric cams pivotally mounted thereon for rotation through respective slots in the connector body into and out of the passage. The cams are configured with at least two externally accessible cam operating levers, whereby a flexible fluid line or other connection to a sanitary fluid system may be attached to or integrated with the back end of the connector body and the connector body may be positioned with respect to a second sanitary fluid fitting configured with a mating flange so as to receive the mating flange through the coupling end into the passage into contact with the sanitary fluid connector gasket and hence with the flat face in the passage. The cams are rotatable thereafter so as to lock the connector body to the second sanitary fluid fitting for fluid flow.

As illustrated in FIGS. 2 and 3, any of the previous examples may be further configured with cam springs 200 whereby the cams 120 are configured to have to be pushed outward or open by coupling action or by manual operation of the cam levers 130 so as to overcome the force of the springs 200, and are biased to return by spring force to a locking position once the opening force is withdrawn, as by full seating of the second fitting within the connector body, or withdrawal of the second fitting from within the connector body. Alternatively, the cams 120 and cam levers 130 may be biased by springs to return to a normally open position, and require a force opposing the spring force for locking. In addition or in the alternative, as illustrated in FIGS. 7-10, there may be an automatic latching mechanism which latches the cam levers in their locked position whenever they are placed there, and holds the cam levers in the locked position until released. The latching mechanism may be configured to release each cam lever independently, or to release all of them collectively.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A quick-connect sanitary fluid connector for coupling a first sanitary fluid fitting to a second sanitary fluid fitting, the second sanitary fluid fitting including a tubular section of substantially uniform diameter and wall thickness terminating in a flange having an outer diameter greater than the diameter of the tubular section, the flange terminating in a coupling face that is configured to receive a sanitary fluid connector gasket, the quick connect sanitary fluid connector comprising:

a first sanitary fluid fitting having a mating end and a fluid system end, the fluid system end being attachable to a sanitary fluid system, the mating end terminating in a first coupling face, the first coupling face being able to receive the sanitary fluid connector gasket;

a connector body having an axially extending interior passage, the first sanitary fluid fitting being secured therein, the interior passage being able to receive therein the flange of the second sanitary fluid fitting, the first and second sanitary fluid fittings when abutted with the sanitary fluid connector gasket sandwiched there between providing an interior fluid passage that is substantially uniform in diameter and featureless, a gap between the two fittings being bridged by an inner surface of the sanitary fluid connector gasket;

a cam locking mechanism including at least two eccentric cams distributed around the connector body and pivotally mounted thereto, the eccentric cams being configured for rotation through respective openings into and out of the interior passage of the connector body, the cams having shapes that enable them to make an over center cam surface contact with a rear surface of the flange of the second sanitary fluid fitting and to apply a pressing force thereto that presses the flange of the second sanitary fluid fitting against the sanitary fluid connector gasket and the coupling face of the first sanitary fluid fitting, thereby forming a sanitary fluid connection seal; and including a cam operating lever attached to each of the eccentric cams, each of the cam operating levers including a proximal element attached to the respective cam and a distal element telescopically combined with the proximal element and joined to the proximal element by a spring, the proximal and distal elements being nested one within the other, the distal element including a catch configured for engagement with a corresponding receptacle attached to the connector housing when the cam operating lever is moved to a locking position and the distal and proximal elements are telescopically retracted by the spring, telescopic extension of the cam lever in opposition to extension of the spring being required to disengage the catch from the receptacle and move the cam operating lever from the locking position to an open position.

2. The sanitary fluid connector of claim 1, wherein at least a portion of the mating end of the first sanitary fluid fitting is surrounded by external screw threads, and the interior passage of the connector body is configured with internal screw threads sized for engagement with the external screw threads of the first sanitary fluid fitting, the first sanitary fluid fitting being thereby adjustably securable within the interior passage of the connector body by adjustment of the relative rotational orientations of the connector body and the first sanitary fluid fitting.

3. The sanitary fluid connector of claim 2, further comprising a rotation locking mechanism configured to inhibit adjustment of the relative rotational orientations of the connector body and the first sanitary fluid fitting.

4. The sanitary fluid connector of claim 3, wherein the rotation locking mechanism includes a ratchet mechanism which permits adjustment of the relative rotational orientations of the connector body and the first sanitary fluid fitting in one direction, but inhibits adjustment of the relative rotational orientations of the connector body and the first sanitary fluid fitting in the other direction.

5. The sanitary fluid connector of claim 1, wherein said first sanitary fluid fitting is fabricated of stainless steel.

6. The sanitary fluid connector of claim 1, a fabrication thereof comprising at least one of stainless steel, ceramic, and plastic.

7. The sanitary fluid connector of claim 1, further comprising said sanitary fluid connector gasket.

8. The sanitary fluid connector of claim 1, said first coupling face of said first sanitary fluid fitting comprising a semi-circular recess for receiving a raised, semicircular rib on one face of said sanitary fluid connector gasket.

9. The sanitary fluid connector of claim 1, further comprising:
   a plurality of cam locking holes provided in the distal and proximal elements of at least one of the cam operating levers, the cam locking holes being aligned when the cam operating lever is in its locking position; and
   at least one locking clip, the locking clip being attached to the cam operating lever by insertion of the locking clip through a retaining hole provided in the cam operating lever, the locking clip being insertable through the cam locking holes by rotation of the locking clip through the retaining hole without detaching the locking clip from the cam operating lever, thereby preventing telescopic extension of the cam operating lever and preventing movement of the cam operating lever from its locking position to its open position.

10. The sanitary fluid connector of claim 1, wherein the sanitary fluid connector is configured for operation at up to 150 psi fluid pressure, and testing at up to 450 psi.

11. A quick-connect sanitary fluid connector for coupling a sanitary fluid system to a sanitary fluid fitting, the sanitary fluid fitting including a tubular section of substantially uniform diameter and wall thickness terminating in a flange having an outer diameter greater than the diameter of the tubular section, the flange terminating in a first coupling face that is configured to receive a sanitary fluid connector gasket, the quick connect sanitary fluid connector comprising:
   a connector body having an axial interior passage extending from a mating end to a second coupling face recessed within the interior passage, the second coupling face being adapted to receive the sanitary fluid connector gasket, the interior passage being sized for insertion therein of the flange of the sanitary fluid fitting, the sanitary fluid fitting and the connector body when the coupling faces are abutted with the sanitary fluid connector gasket sandwiched there between providing an interior fluid passage that is substantially uniform in diameter and featureless, gap between the first and second coupling faces being bridged by an inner surface of the fluid connector gasket;
   a cam locking mechanism including at least two eccentric cams distributed around the connector body and pivotally mounted thereto, the eccentric cams being configured for rotation through respective openings into and out of the interior passage of the connector body, the cams having shapes that enable them to make an over center cam surface contact with a rear surface of the flange of the sanitary fluid fitting and apply a pressing force thereto that presses the flange of the sanitary fluid fitting against the sanitary fluid connector gasket and the second coupling face of the connector body thereby forming a sanitary fluid connection seal; and
   including a cam operating lever attached to each of the eccentric cams, each of the cam operating levers including a proximal element attached to the respective cam and a distal element telescopically combined with the proximal element and joined to the proximal element by a spring, the proximal and distal elements being nested one within the other, the distal element including a catch configured for engagement with a corresponding receptacle attached to the connector housing when the cam operating lever is moved to a locking position and the distal and proximal elements are telescopically retracted by the spring, telescopic extension of the cam lever in opposition to extension of the spring being required to disengage the catch from the receptacle and move the cam operating lever from the locking position to an open position.

12. The sanitary fluid connector of claim 11, a fabrication thereof comprising at least one of stainless steel, ceramic, and plastic.

13. The sanitary fluid connector of claim 11, further comprising said sanitary fluid connector gasket.

14. The sanitary fluid connector of claim 11, said second coupling face comprising a semi-circular recess for receiving a raised, semicircular rib on one face of said sanitary fluid connector gasket.

15. The sanitary fluid connector of claim 11, further comprising:
   a plurality of cam locking holes provided in the distal and proximal elements of at least one of the cam operating levers, the cam locking holes being aligned when the cam operating lever is in its locking position; and
   at least one locking clip, the locking clip being attached to the cam operating lever by insertion of the locking clip through a retaining hole provided in the cam operating lever, the locking clip being insertable through the cam locking holes by rotation of the locking clip through the retaining hole without detaching the locking clip from the cam operating lever, thereby preventing telescopic extension of the cam operating lever and preventing movement of the cam operating lever from its locking position to its open position.

16. The sanitary fluid connector of claim 11, wherein the sanitary fluid connector is configured for operation at up to 150 psi fluid pressure, and testing at up to 450 psi.

* * * * *